W. C. FRICK.
APPARATUS FOR MAKING WELDED TUBING.
APPLICATION FILED JULY 19, 1909.

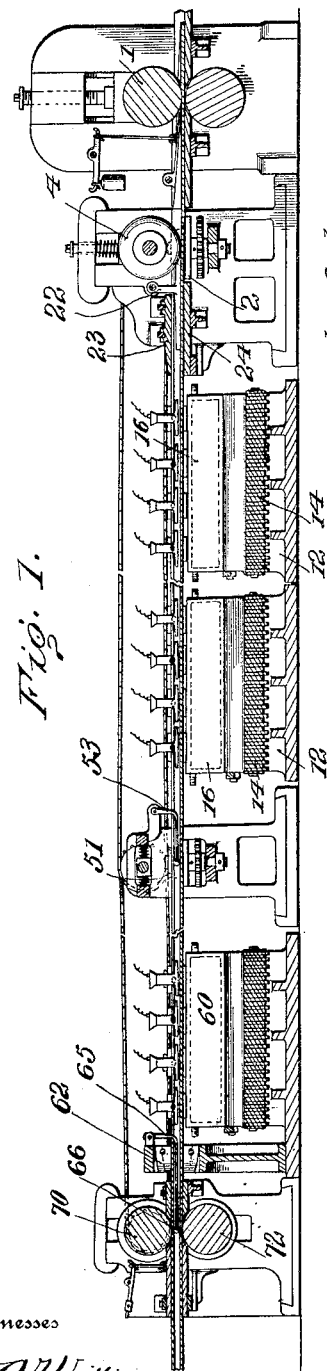

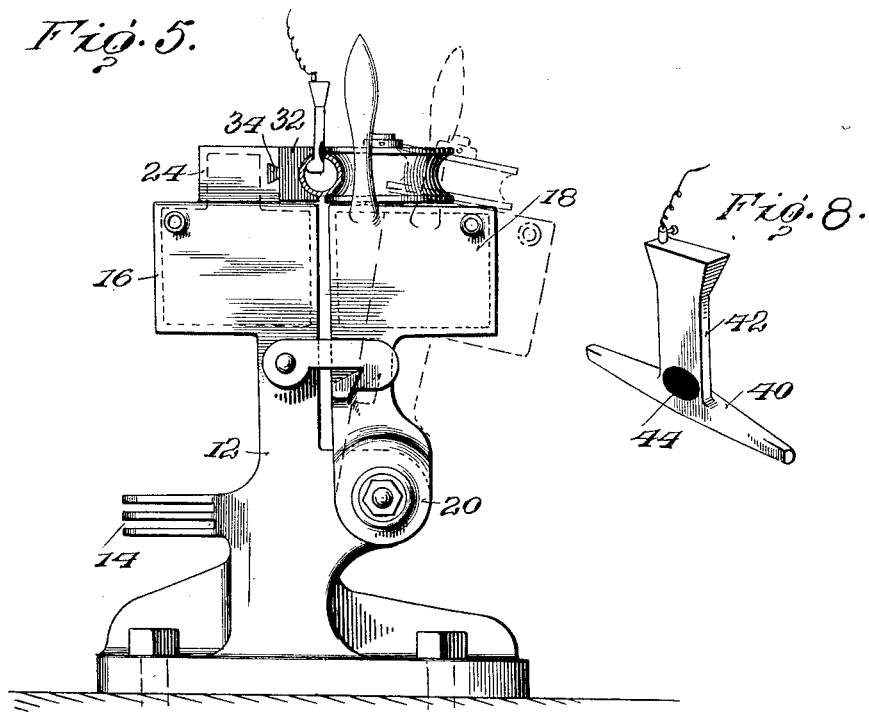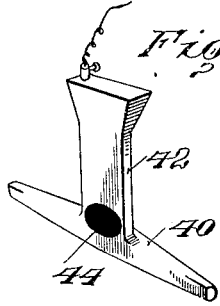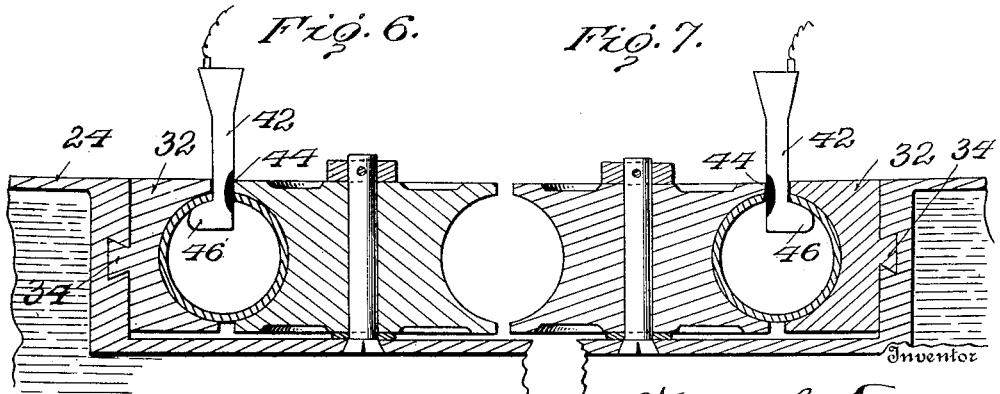

1,105,764.

Patented Aug. 4, 1914.

3 SHEETS—SHEET 3.

UNITED STATES PATENT OFFICE.

WILLIAM C. FRICK, OF DEAL BEACH, NEW JERSEY.

APPARATUS FOR MAKING WELDED TUBING.

1,105,764.  Specification of Letters Patent.  Patented Aug. 4, 1914.

Application filed July 19, 1909. Serial No. 508,447.

*To all whom it may concern:*

Be it known that I, WILLIAM C. FRICK, a citizen of the United States of America, and a resident of Deal Beach, in the county of Monmouth and State of New Jersey, have invented certain new and useful Improvements in Apparatus for Making Welded Tubing, of which the following is a specification.

This invention relates to apparatus for manufacturing welded tubing and it is designed as an improvement on the apparatus shown in my United States Patent No. 989,497 dated April 11, 1911 for method of and means for making welded tubing.

In other words it is the object of my invention to produce tubing by one continuous and progressive method starting from the point where the metal leaves the rolling mill heating furnace and ending with the finished product in the shape of welded tubing. And as in the apparatus shown in my aforesaid application, I employ a succession of heating devices whereby I augment the heat remaining in the skelp after the rolling thereof, by heating the edges of the tubing at a plurality of places along the path of the tube, until said remaining heat, supplemented by the additional heat, raises the heat of the formed tube, successively and progressively, until a welding heat is reached. By supplementing heat successively and progressively to the already heated product of the rolling mill and its furnace, I am enabled to heat and weld the tubing as rapidly as the mill produces it.

My invention therefore consists of the improved apparatus for forming pipe, bringing the heat of the product successively and progressively up to the welding point, and then welding the edges of the formed tube.

Figure 9:
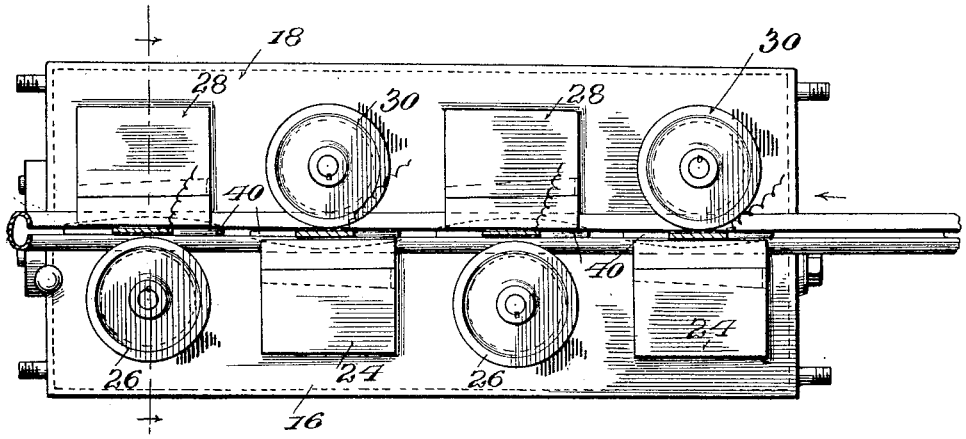
Figure 10:
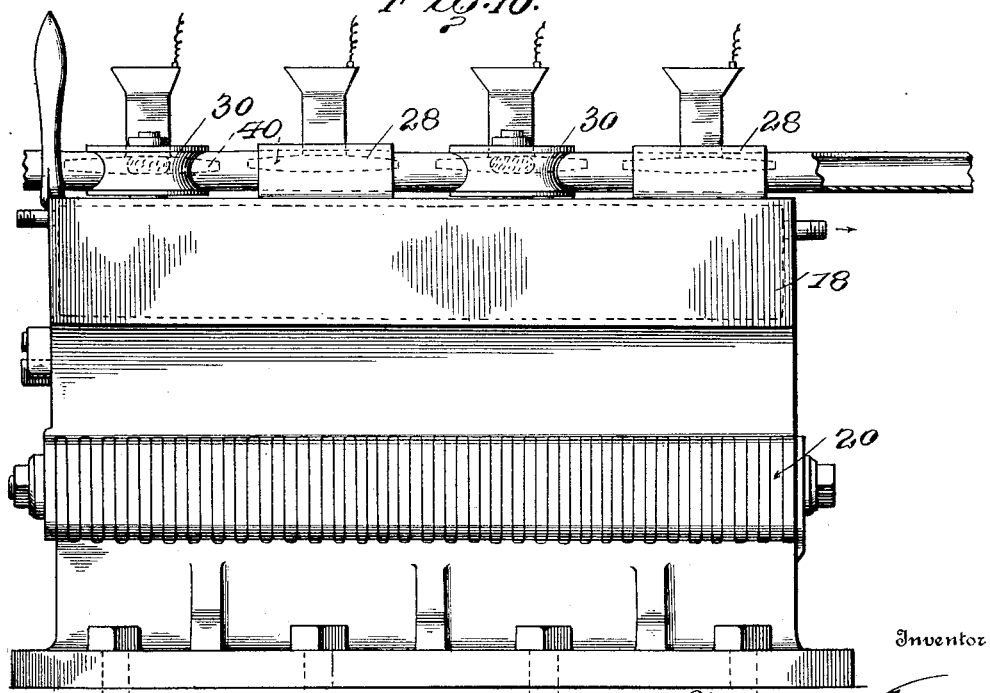

In the drawings accompanying and forming part thereof and which it will be understood represent the preferred though not the necessary embodiment of my invention: Figure 1 is a sectional view of apparatus showing, in conventional form, my invention; the apparatus being broken away at the points indicated as will be hereinafter explained. Fig. 2 is a top plan view of the apparatus shown in Fig. 1. Fig. 3 is a detail of the gearing for driving the forming and feeding rolls. Fig. 4 is a view showing the different shapes the metal assumes through the apparatus. Fig. 5 is an end elevation of one set of the heating devices. Figs. 6 and 7 are cross-sections through heating devices. Fig. 8 is a detail of one of the interior heating terminals. Fig. 9 is a top plan of one set of the heating devices. Fig. 10 is a side elevation of one set of the heating devices and a table supporting the same.

Referring now to the detail of the drawings by numerals: 1 designates in conventional form the last set of rolls of a mill of continuous type, the other three sets not being illustrated. This mill however may be of any form and not necessarily of the continuous type, since the present invention does not relate to any form of mill, and other means may be substituted for that partially shown in the drawings. Yet it may not be amiss to state that in the preferable embodiment of my invention, as illustrated in my aforesaid application, the billet as it leaves the furnace is rolled into shape and then formed into a tube, or into a tube shape, in such a manner as to save as much as possible of its original heat, to which supplemental heat may be successively and progressively added to bring the edges of the formed tube to the welding point, and as the said billet passes through the successive passes of the mill, it is gradually rolled into shape so that by the time it passes out of last of the four passes, or pair of rolls 1, it is of the shape shown at $a$ in Fig. 4 directly under said rolls 1 in Fig. 1. The skelp is now fed forward and passes through three rolls 2, 3 and 4 which serve the double function of forming the skelp into U-shape as shown at $b$ in Fig. 4, and of also feeding the skelp through the successive heating devices. I regard the use of these three rolls 2, 3 and 4 as important since, as stated, I am not only enabled to form the skelp into U-shape but the three rolls co-act to form an excellent feeding mechanism. After passing between the rolls 2, 3 and 4, the U-shaped skelp is now passed through the devices 22—23—24 by which the U-shaped skelp is brought to the shapes shown at $c$ and $d$ in Fig. 4. The now almost formed tube is fed through the heating devices and remains of the shape shown at $d$ until it finally passes through the welding dies which will be hereinafter referred to.

The heating devices are of novel shape and will now be described. In order to successively augment the heat which remains in the skelp after passing through the rolling mill, it is necessary to use quite a number of heating devices, as described in my aforesaid application, but for lack of room in my drawings I have only illustrated two sets of heating devices in Fig. 1 instead of the four sets I prefer to employ. Each of these sets of heating devices is of the construction shown more particularly in Figs. 5 to 10 inclusive. Each of them comprises a suitable base 12 having bus-bars 14 for an electrical connection. The upper part of the base is formed with a stationary water jacketed table 16 and on the opposite side there is a movable water jacketed table 18, which is pivoted to the main part 12 by means of a hinge 20 constructed to form a good electrical conductor between the part 18 and the bus-bar 12.

Each section of the table, one designated 16 and the other 18, is provided with two fixed conductors and two rollers; the fixed conductors on the part marked 16 being designated 24 and the rollers 26 while the fixed conductors on the table 18 are designated 28 and the rollers 30. Each of the fixed conductors 24 and 28 are provided with detachable terminals 32 so that when these become worn they may be readily replaced, the terminals have tapering dove-tails 34 fitting into similarly shaped apertures in the conductors 24 and 28. It might be well to state here that the parts 24 and 32 are of good conducting material whereas the rollers 26 may be of non-conducting material and the said rollers therefor serve no purpose except to hold the tube in shape during the heating process. Coacting with the exterior terminals 32 are interior terminals 40 which are of the peculiar shape shown in Figs. 5, 6, 7 and 8 and which may be carried by any suitable supports (not shown). The web 42 of this terminal is formed on one side with a non-conducting portion 44 so that the electric current will be compelled to pass through the edge of the pipe opposite the non-conducting portion 44 and the terminal on the side opposite said non-conducting portion 44 is formed with an off-set 46 which is formed so as to closely fit the interior of the pipe or tube and hold the same in proper shape during the heating thereof. These off-sets 46 not only act as guides to control the pipe so that it follows a perfectly straight line but they also prevent the collapsing or caving in of the heated edges of the pipe. Such collapsing might occur from the necessary pressure of the exterior terminal and its co-acting roll.

It will be observed that the terminals 40 are staggered—that is to say, one terminal is arranged to conduct the current to one edge of the pipe, while the next terminal is arranged to conduct the current to the opposite edge of the pipe. I deem this of the utmost importance since in practical operation I find that it is necessary, in order to obtain the very best results, to heat the two edges of the pipe as uniformly as possible and by arranging the terminals alternately as shown in my drawings, I insure an equal distribution of the heat through both edges of the pipe.

From the foregoing and the drawings it will be observed that as the tube is forced by means of the rollers 2, 3 and 4, through the successive heating devices, the electric current passes down through the first terminal through the edge of the pipe opposite the insulating portion 44, through the terminal 32 and from thence down to the bus-bars 14; while a portion of the pipe just beyond the first set of heating devices is similarly heated on the opposite edge by reason of the fact that the current now passes from the terminal 40 through the pipe to the opposite conductor 28 and from thence through the table 18 through the hinge 20 to the bus-bars 18. Thus, as I have stated, an equal amount of heat is imparted to each edge of the tube as it is readily fed through the succession of heating devices.

While I have hereinbefore stated there are only two sets or banks of heating devices shown in Fig. 1, I prefer to employ four since by using four I am enabled to rapidly augment the heat as the tube passes through said heating devices. After the tube leaves the heating devices it passes through a set of rollers designated 50 and 51 in Fig. 2, these rollers co-acting with a suitable mandrel 53 having a ball shaped end of just the exact size of the interior of the pipe at that point, said ball being located inside of the pipe between the rollers 50 and 51. These rollers 50 and 51 are driven from a shaft 55 which receives motion from the same shaft which drives the rollers 2, 3 and 4. The purpose of these rollers 50 and 51 is to feed the pipe, which is now heated to almost welding point into another series of heating devices designated 60 in Figs. 1 and 2, these heating devices 60 being sufficient to bring the heat in the pipe to the welding point. These heating devices are duplicates of the heating devices hereinbefore described and although only one set is shown in Figs. 1 and 2 I prefer to employ two. After the tube passes out of the last of the heating devices 60 the edges will now be at welding heat and therefore must be brought together and held in welding or fusing contact. To accomplish this purpose I employ dies 62 and 63 which are similar to those shown in my aforesaid application and which are arranged to bring the edges of the pipe together whereby they are fused and welded. Passing through the dies 62 and 63 is another mandrel 65 similar to the mandrel 53 and which is also provided with a ball 66 located within the pipe, and which is of the exact diameter of the interior of the finished pipe, and is located at a point where it is just between two rolls 70 and 72 which are for the purpose of drawing the finished pipe through the welding dies 62 and 63.

It is obvious that changes and modifications may be made in my invention without departing from the spirit thereof, the scope of the invention being set forth by the appended claims. Not only may changes be made in the heating devices but it will be evident that other welding devices than the dies 62 and 63 may be employed to bring the heating edges into welding contact.

What I claim as new is:

1. In apparatus of the character described, the combination of means for feeding a slotted tube, and means for independently heating the opposite edges of the tube, said independent heating means being arranged to alternately heat the edges of a tube, first heating one edge of the tube and then heating the opposite edge.

2. In apparatus of the character described, means for heating a slotted tube comprising two sets of terminals, arranged to alternately heat the edges of a tube, one set heating one edge of the tube and the next set heating the opposite edge of the tube.

3. In apparatus of the character described, means for heating a slotted tube comprising a plurality of sets of interior and external terminals, arranged to alternately heat the edges of a tube, one set heating one edge of the tube and the next set heating the opposite edge of the tube, in combination with rollers located on the exterior of the tube opposite the external terminals.

4. In apparatus of the character described, means for heating a slotted tube comprising a plurality of sets of interior and external terminals, arranged to alternately heat the edges of a tube, one set heating one edge of the tube and the next set heating the opposite edge of the tube, in combination with rollers located on the exterior of the tube opposite the external terminals, said exterior terminals and said rollers being concave.

5. In apparatus of the character described, means for heating a slotted tube comprising a plurality of sets of interior and external terminals, arranged to alternately heat the edges of a tube, one set heating one edge of the tube and the next set heating the opposite edge of the tube, the interior terminals being insulated on one side so as to heat only one edge.

6. In apparatus of the character described, means for heating a slotted tube comprising a plurality of sets of interior and external terminals, arranged to alternately heat the edges of a tube, one set heating one edge of the tube and the next set heating the opposite edge of the tube, the interior terminals having offsets fitting the interior of the tube to prevent collapsing of the same.

7. In apparatus of the character described, means for heating a slotted tube comprising a plurality of sets of interior and external terminals, arranged to alternately heat the edges of a tube, one set heating one edge of the tube and the next set heating the opposite edge of the tube, the interior terminals being insulated on one side so as to heat only one edge and also having off-sets on the interior of the tube preventing the tube from collapsing.

8. In apparatus of the character described, the combination of tube feeding devices, a plurality of sets of heating devices arranged to alternately heat the opposite edges of a slotted tube, auxiliary feeding devices, further sets of heating devices, and means for bringing the edges of the tube in contact to weld the same.

9. In apparatus of the character described, the combination of tube feeding devices, a plurality of sets of heating devices arranged to alternately heat the opposite edges of a slotted tube, said heating devices comprising terminals, one set heating one edge of the tube and the next set heating the opposite edge of the tube, auxiliary feeding devices, further sets of heating devices, and means for bringing the edges of the tube in contact to weld the same.

10. In apparatus of the character described, the combination of tube feeding devices, means for heating a slotted tube comprising a plurality of sets of interior and external terminals arranged alternately, one interior terminal contracting with one edge of the tube and the next with the opposite edge of the tube, auxiliary feeding devices, further heating devices and means for bringing the edge of the tube in contact to weld the same.

11. In apparatus of the character described, the combination of tube feeding devices, means for heating a slotted tube comprising a plurality of sets of interior and external terminals arranged alternately, one interior terminal contacting with one edge of the tube and the next with the opposite edge of the tube, rollers located on the exteerior of the tube, said exterior terminals and said rollers being concave, auxiliary feeding devices, further heating devices and means for bringing the edge of the tube in contact to weld the same.

12. In apparatus of the character described, the combination of reducing rolls, means for forming or shaping the billet into tubular shape, means for alternately heating the opposing edges of a slotted tube, additional feeding means, additional heating devices, and means for bringing the edges in contact to weld the same.

13. In apparatus of the character described, the combination of reducing rolls, means for forming or shaping the billet into tubular shape, means for alternately heating the opposing edges of a slotted tube, consisting of a plurality of sets of heating devices comprising interior and external terminals, one set heating one edge of the tube and the next set heating the opposite edge of the tube, additional feeding means, additional heating devices, and means for bringing the edges in contact to weld the same.

14. In apparatus of the character described, means for heating a slotted tube comprising a plurality of sets of interior and external terminals, arranged to alternately heat the edges of a tube, one set heating one edge of the tube and the next set heating the opposite edge of the tube, said exterior terminals having detachable contacting points.

15. In apparatus of the character described, a frame comprising two water jacketed tables electrically connected, and a plurality of sets of interior and external terminals, one set of terminals heating one edge of a slotted tube and the next set heating the opposite edge of the tube.

16. In apparatus of the character described, a frame comprising two water jacketed tables electrically connected, a plurality of sets of interior and external terminals, one set of terminals heating one edge of a slotted tube and the next set heating the opposite edge of the tube, and rollers located on the exterior of the tube opposite the external terminals.

17. In apparatus of the character described, a frame carrying heating devices, said frame comprising two tables one of which is hinged to the other, and each of said heating devices comprising interior and external terminals, one set of terminals heating one edge of a slotted tube and the next set heating the opposite edge of the tube.

18. In apparatus of the character described, a frame carrying heating devices, said frame comprising two tables one of which is hinged to the other, and each of said heating devices comprising interior and external terminals, one set of terminals heating one edge of a slotted tube and the next set heating the opposite edge of the tube and rollers located on the exterior of the tube opposite the external terminals, said exterior terminals and said rollers being concave.

19. In apparatus of the character described the combination of a rolling mill adapted to roll metal into skelp shape, tube forming or shaping means adapted to shape said heated skelp into a tube, means comprising a plurality of heating devices adapted to successively and progressively add or supplement the heat to said already heated tube, said plurality of heating devices comprising a plurality of sets of terminals arranged to alternately heat the edges of a tube, one set heating one edge of the tube and the next set heating the opposite edge of the tube, and means for welding or fusing the edges of said tube.

20. In apparatus of the character described the combination of a rolling mill adapted to roll metal into skelp shape, tube forming or shaping means adapted to shape said heated skelp into a tube, means comprising a plurality of heating devices adapted to successively and progressively add or supplement the heat to said already heated tube, said plurality of heating devices comprising a plurality of sets of terminals arranged to alternately heat the edges of a tube, one set heating one edge of the tube and the next set heating the opposite edge of the tube, rollers located on the exterior of the tube opposite the external terminals, and means for welding or fusing the edges of said tube.

Signed by me at Asbury Park New Jersey this 30th day of June 1909.

WILLIAM C. FRICK.

Witnesses:
BERTHA G. STRYKER,
ANNA F. WHITLOCK.

Copies of this patent may be obtained for five cents each, by addressing the " Commissioner of Patents, Washington, D. C."